(12) United States Patent
Tunno et al.

(10) Patent No.: US 6,389,654 B1
(45) Date of Patent: May 21, 2002

(54) CLAMP ASSEMBLY

(75) Inventors: Robert Tunno, Greensburg; Richard A. Lovgren, Natrona Heights; John A. Schreckengost, Cadogan, all of PA (US)

(73) Assignee: Breeze Industrial Products Company, L.P., Saltsburg, PA (US)

( * ) Notice: Subject to any disclaimer, the term of this patent is extended or adjusted under 35 U.S.C. 154(b) by 0 days.

(21) Appl. No.: 09/937,462

(22) PCT Filed: Mar. 24, 2000

(86) PCT No.: PCT/US00/07857

§ 371 Date: Sep. 24, 2001

§ 102(e) Date: Sep. 24, 2001

(87) PCT Pub. No.: WO00/57095

PCT Pub. Date: Sep. 28, 2000

Related U.S. Application Data (60) Provisional application No. 60/126,178, filed on Mar. 25, 1999.

(51) Int. Cl.$^7$ .......................... A44B 21/00; B65D 63/00
(52) U.S. Cl. ...................... 24/274 P; 24/274 R; 24/19; 24/20 LS; 24/279
(58) Field of Search ........................... 24/274 P, 274 R, 24/279 R, 19, 20 LS; 285/367, 420

(56) References Cited

U.S. PATENT DOCUMENTS

| | | | | | |
|---|---|---|---|---|---|
| 2,189,172 A | * | 2/1940 | Hathorn | .................... | 24/274 P |
| 3,604,074 A | * | 9/1971 | Bambas | .................... | 24/274 R |
| 4,021,892 A | * | 5/1977 | Piper | ........................ | 24/274 R |
| 4,445,254 A | * | 5/1984 | Allert | ........................ | 24/274 R |
| 5,410,781 A | * | 5/1995 | Anjos et al. | .............. | 24/274 R |
| 5,729,873 A | * | 3/1998 | Miley | ........................ | 24/274 R |
| 5,909,852 A | * | 6/1999 | Allert | .......................... | 24/279 |

* cited by examiner

Primary Examiner—Victor N. Sakran
(74) Attorney, Agent, or Firm—Webb Ziesenheim Logdson Orkin & Hanson, P.C.

(57) ABSTRACT

A clamp assembly (8) in accordance with the present invention includes a tightening mechanism (10) connected to an elongated, flat metal band (12). The metal band is configured to encircle a conduit. The tightening mechanism (10) includes a saddle (14) securely attached to the band (12). A housing (16) is pivotally and slidably connected to the saddle (14). The housing (16) defines a recess (17) housing a locking worm (18). The locking, worm (18) is rotatable in the housing and defines spiral threads (20) adapted to cooperate with slots (26) defined in the band. The housing (16) is pivotally and slidably connected to the saddle (14) so that the housing is pivotable relative to the saddle and movable in an axial direction substantially parallel to the saddle to further engage and lock with the saddle in a closed position of the tightening mechanism.

20 Claims, 8 Drawing Sheets

CLAMP ASSEMBLY

This application claims the benefit of Provisional Application Ser. No. 60/126,178, filed Mar. 25, 1999.

BACKGROUND OF THE INVENTION

1. Field of the Invention

The present invention relates to a clamp assembly for use with a conduit such as a hose, tube or pipe.

2. Description of the Prior Art

Clamps of the type disclosed herein generally include an elongated metal band adapted to encircle a conduit such as a hose, tube or pipe. The band defines a series of slots. A screw housing is generally fastened to the band. A tightening screw or "worm" is rotatably mounted in the housing and the clamp is attached by extending the slotted end of the band through the housing so that the threads of the tightening screw engage the slots in the band. As the screw is tightened, the slotted or "free end" of the band is drawn through the housing until the band is firmly clamped around the conduit.

In clamps of the type discussed hereinabove, it is advantageous if the clamp is capable of rapid attachment and detachment from the conduit. However, in most prior art clamps the tightening or loosening process is relatively slow and tedious because the free end of the band is drawn through or retracted from the housing only by rotation of the tightening screw through the use of a screwdriver. One prior art solution is to provide a pivotable tightening screw connected to the housing so that the tightening screw can be pivoted into and out of engagement with the slots in the band. According to this design, rotation of the tightening screw is necessary only for final tightening or initial loosening of the clamp. However, this design is not completely satisfactory because of the danger of inadvertent release of the pivotable tightening screw. Special locking devices are sometimes used in this design in an attempt to overcome this problem. However, no practical high strength worm drive clamp is known to be available having quick connect and quick disconnect features.

Accordingly, the object of the present invention is to provide a clamp assembly having quick connect and disconnect features but overcomes the disadvantages discussed previously in connection with known prior art clamps. It is a further object of the present invention to provide a clamp assembly having a relatively simple and inexpensive construction.

SUMMARY OF THE INVENTION

The above objects are accomplished with a clamp assembly for use with a conduit made in accordance with the present invention. The clamp assembly includes a flexible band adapted to encircle the conduit. The band has a free end defining a plurality of slots. A saddle is secured to the band and includes a first rivet member and a second rivet member located at opposite ends of the saddle. The first and second rivet members each define a first recess. The first rivet member defines a second recess opening in an opposite direction from the first recess. The saddle may include a pair of equally spaced first rivet members and a pair of equally spaced second rivet members located at opposite ends of the saddle. A housing is pivotally connected to the saddle by the first rivet member. The housing has a sidewall defining openings configured to cooperate with the first and second rivet members. A worm screw is positioned in the housing and rotatably connected to the housing. The housing and worm screw are pivotable about the first rivet member between an open position in which the housing and worm screw form an angle with the saddle and in which the worm screw defines a space with the saddle for receiving the free end of the band, and a closed position in which the first and second rivet members substantially extend through the openings in the sidewall of the housing. In addition, with the free end of the band positioned between the worm screw and the saddle and with the housing and worm screw in the closed position, the worm screw engages the slots defined in the free end of the band for tightening the clamp assembly. Furthermore, in the closed position of the housing and worm screw, the housing is movable in an axial direction relative to the saddle such that the sidewall of the housing seats in the first recess defined by the first and second rivet members.

The saddle may be secured to the band by one of welding, crimping and fasteners. The first recess may be slanted in a direction toward a base portion of the saddle. The first rivet member may include a connecting tab which is used to connect the housing to the saddle. The connecting tab may be curled over the sidewall of the housing.

The worm screw may include a head portion defining a slot configured to accept a screwdriver for tightening the clamp assembly. The worm screw may further include a terminal portion and define grooves adjacent the head portion and the terminal portion. The housing may include a substantially semicircular-shaped body portion for housing the worm screw. The body portion is preferably received in the grooves to rotatably connect the worm screw to the housing. Finally, the band, the saddle, the housing and the worm screw are preferably made of stainless steel.

Further details and advantages of the present invention will become apparent from the following detailed description, in conjunction with the drawings.

DETAILED DESCRIPTION OF THE PREFERRED EMBODIMENT

Figure 1:
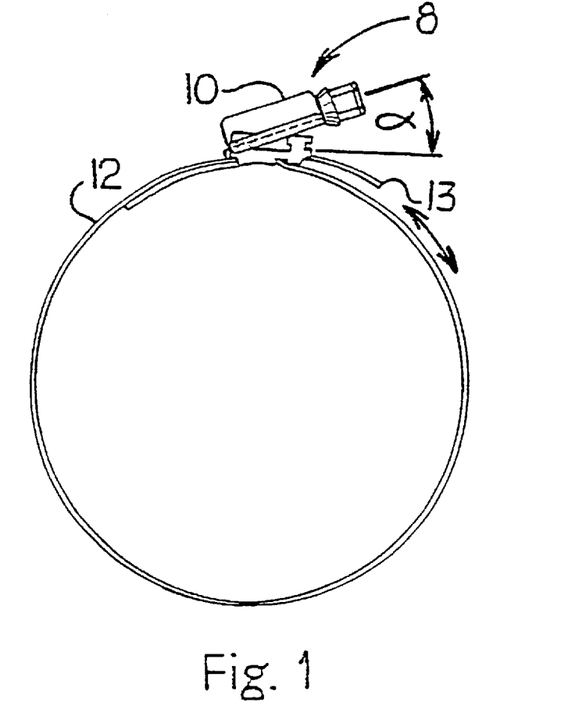
FIG. 1 is an elevational side view of a clamp assembly in accordance with the present invention shown in an open position and coacting with a band.
Figure 2:
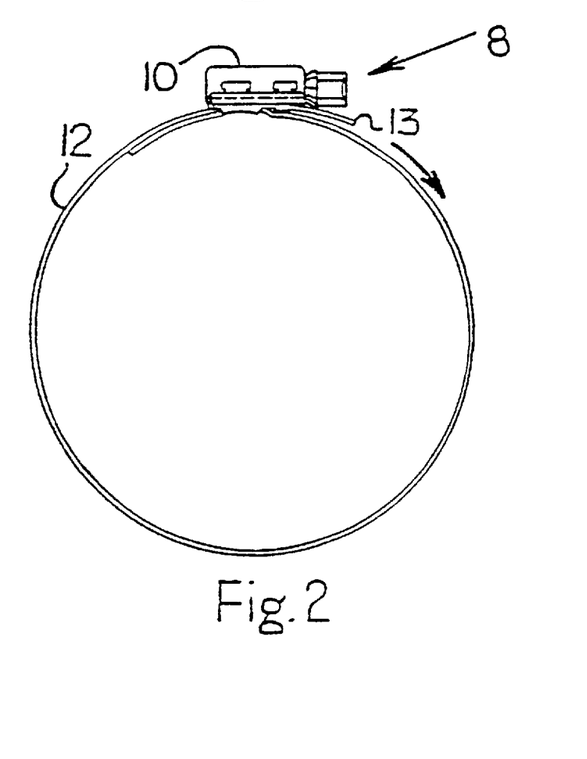
FIG. 2 is an elevational side view of the clamp assembly of FIG. 1 shown in a closed position.

Referring to FIGS. 1 and 2, a clamp assembly 8 made in accordance with the present invention generally includes a tightening mechanism 10 connected to an elongated, flat metal band 12. The band 12 is configured to encircle a conduit (not shown) such as a hose, tube or pipe. FIG. 1 shows the tightening mechanism 10 in an open position and having a free end 13 of the band 12 extending therethrough. FIG. 2 shows the tightening mechanism 10 in a closed position engaging the free end 13 of the band 12.

Figure 3:
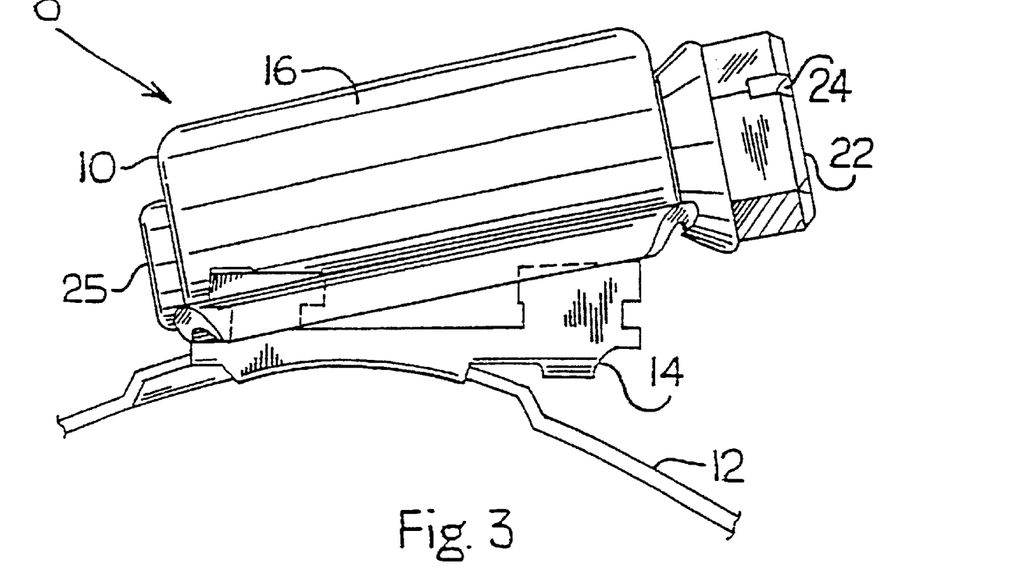
FIG. 3 is an elevational side view of the clamp assembly in accordance with the present invention shown in an open position and showing hidden lines.
Figure 4:
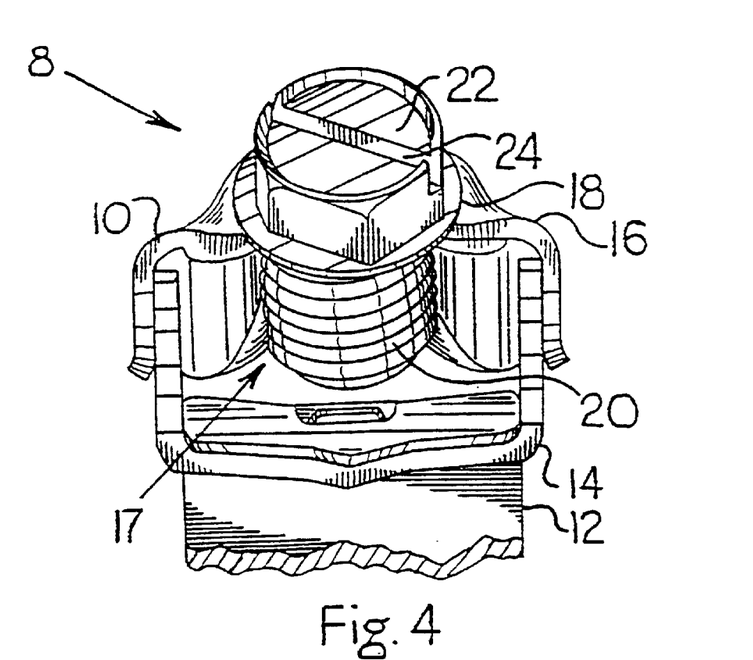
FIG. 4 is a front elevational view of the clamp assembly of FIG. 3
Figure 5:
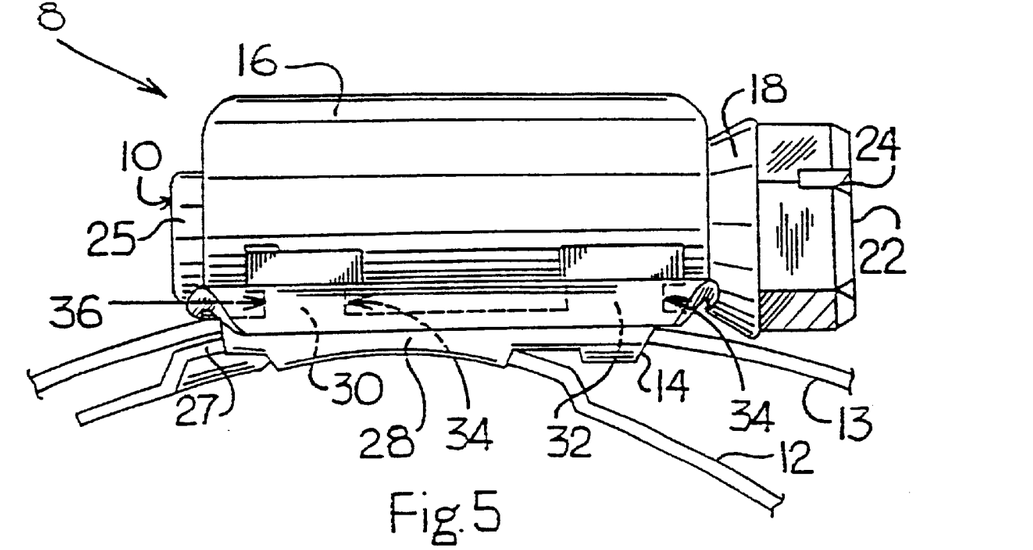
FIG. 5 is an elevational side view of the clamp assembly in accordance with the present invention shown in a closed position and showing hidden lines.
Figure 6:
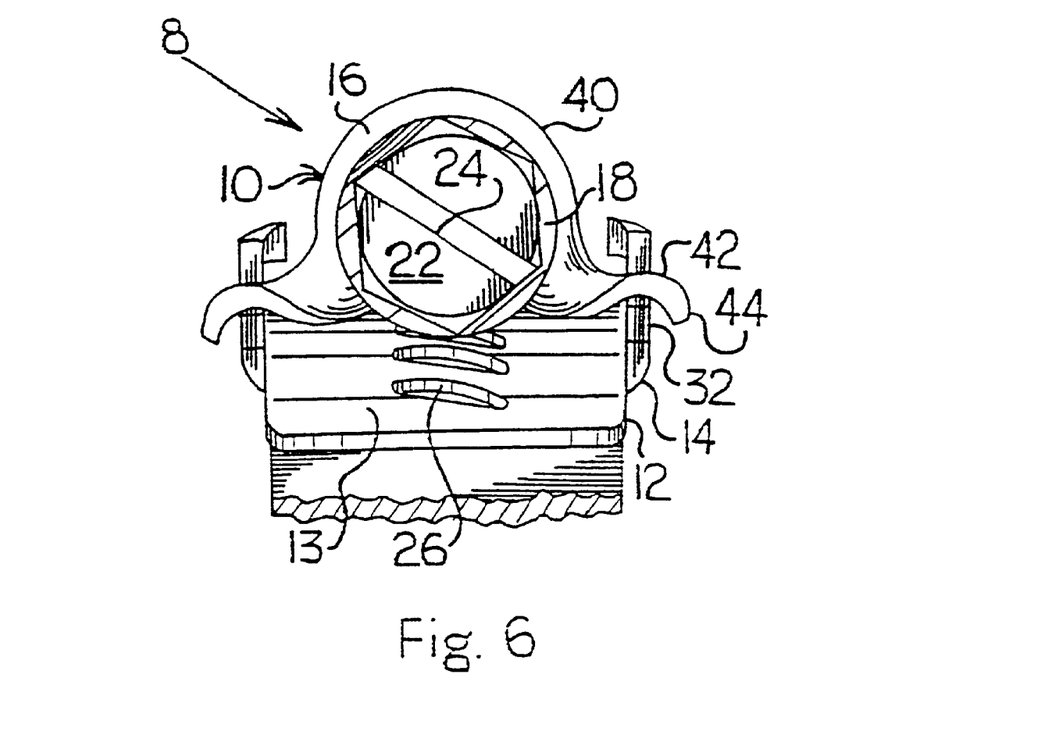
FIG. 6 is a front elevational view of the clamp assembly of FIG. 5.
Figure 7:
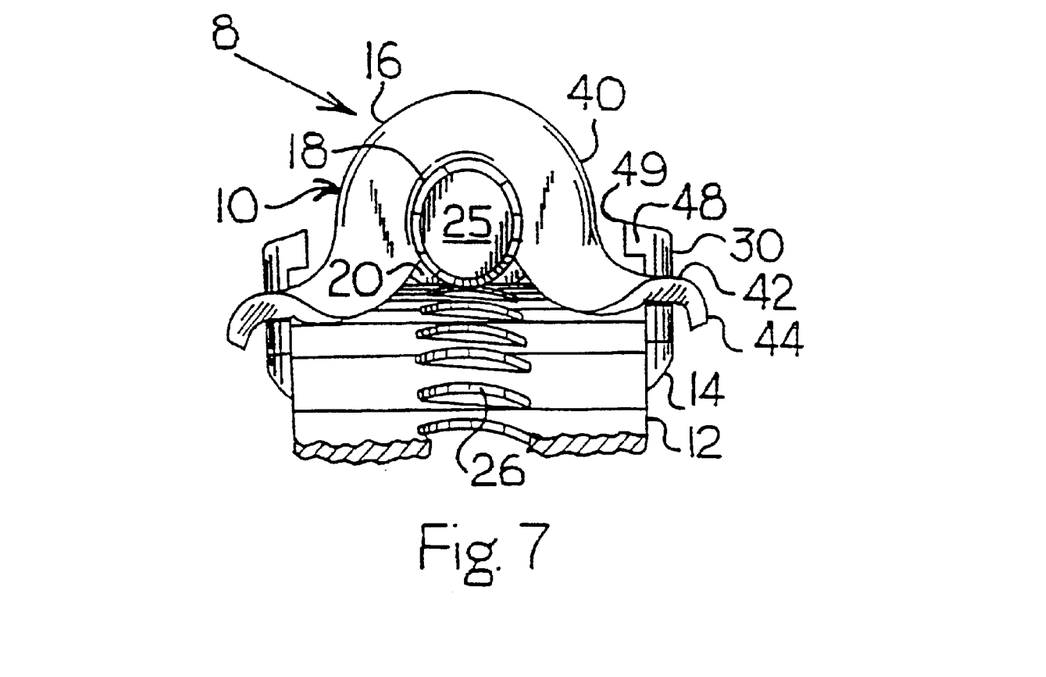
FIG. 7 is a rear elevational view of the clamp assembly of FIG. 5.

Referring to FIGS. 3 and 4, the tightening mechanism 10 includes a saddle 14 permanently attached to the band 12. The saddle 14 may be secured to the band 12 by spot welding, crimping, mechanical fasteners such as rivets or by any other similar means known in the art. A housing 16 is pivotally and slidably connected to the saddle 14. The housing 16 is substantially U-shaped in vertical cross section and defines a recess 17 housing a rotatable locking worm 18, or worm screw. The locking worm 18 defines spiral threads 20 extending substantially the length of the locking worm 18. The locking worm 18 includes a head portion 22 defining a slot 24 configured to cooperate with a screwdriver (not shown) for operation of the tightening mechanism 10. The locking worm 18 further includes a terminal end 25 opposite from the head portion 22 and extending out of the housing 16.

Figure 8:
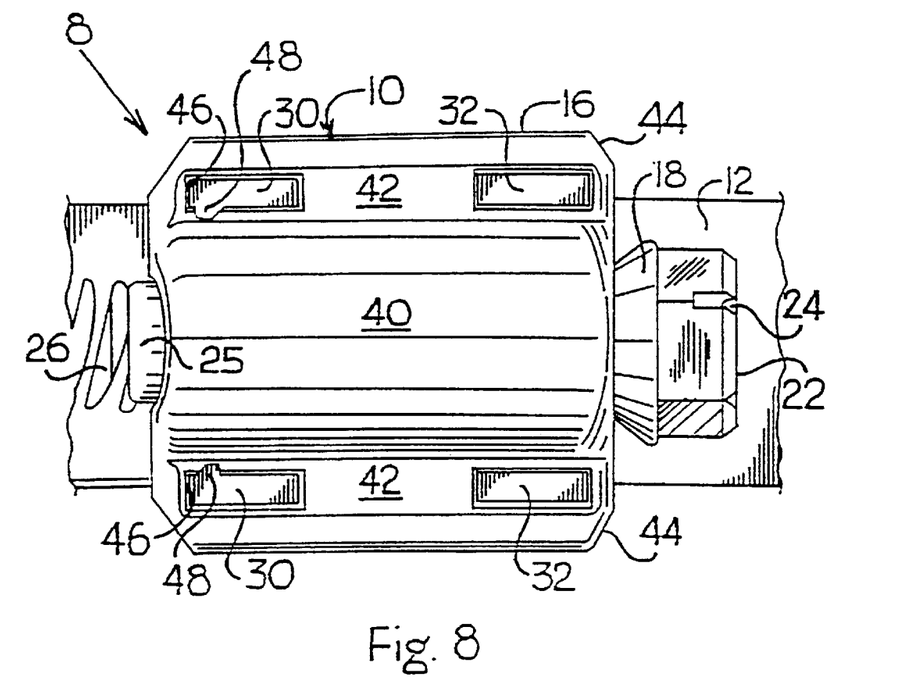
FIG. 8 is a top plan view of the clamp assembly of FIG. 5.

Referring now to FIGS. 5–8, the free end 13, or first end, of the band 12 defines a series of longitudinally-spaced, transversely-extending slots or apertures 26. A second or fixed end 27 of the band 12 has the tightening mechanism 10 secured thereto. The spiral threads 20 of the locking worm 18 are adapted to co-act with the apertures 26. As shown in FIG. 8, the apertures 26 may be inclined at a slight angle of about 5° relative to a transverse axis of the band 12 so that the spiral threads 20 easily cooperate with the apertures 26 when the tightening mechanism 10 is positioned in the closed position. An exemplary material for the band 12 includes 300 series stainless steel.

The saddle 14 includes a base portion 28 attached to the second end 27 of the band 12. The saddle 14 includes two upstanding first or front rivet members 30 and two upstanding second or rear rivet members 32. The front and rear rivet members 30,32 are preferably integrally formed as part of the saddle 14. The saddle 14 is formed such that there is clearance for the band 12 to pass between the two front rivet members 30 and the two rear rivet members 32. The front and rear rivet members 30,32 each define a first recess 34 configured to cooperate with the housing 16 as further described hereinafter. The front rivet members 30 each further define a second recess 36 also configured to cooperate with the housing 16 but facing in the opposite direction from the first recesses 34. The second recesses 36 defined by the front rivet members 30 enable the housing 16 to pivot relative to the saddle 14 as described further hereinafter. Additionally, the first recesses 34 defined by the front and rear rivet members 30,32 and the second recesses 36 defined by the front rivet members 30 are configured to cooperate with the housing 16 so that the housing 16 may move axially, or "traverse", relative to the saddle 14. This axial or traverse movement of the housing 16 relative to the saddle 14 provides a "wedge" action which locks the housing 16 into engagement with the saddle 14 and ensures high torque transmission to the band 12. This wedge action also locks the locking worm 18, or screw, in place in the housing 16 which allows the housing/screw combination to remain intact and yet pivot in concert so that the band 12 may move freely through the tightening mechanism 10. An exemplary material for the saddle 14 includes 300 series stainless steel.

Figure 9:
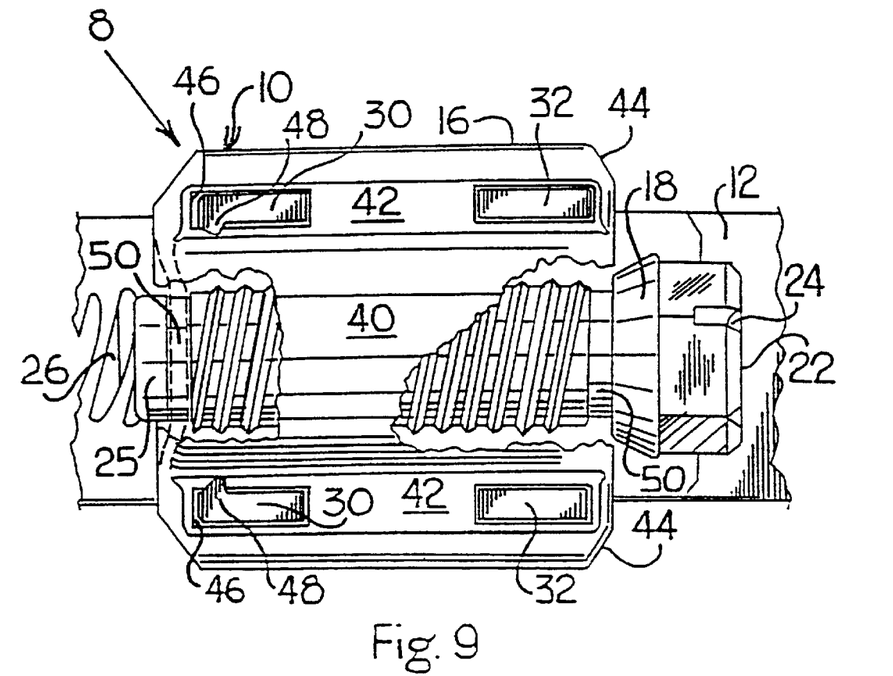
FIG. 9 is a partially cutaway top plan view of the clamp assembly of FIG. 5.
Figure 10:
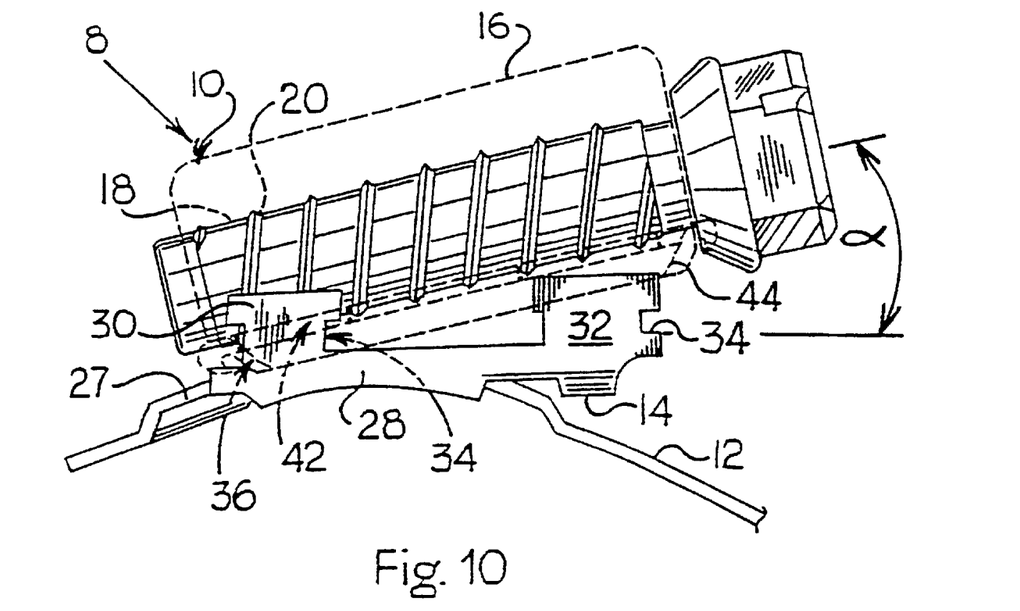
FIG. 10 is a partially broken elevational side view of the clamp assembly in accordance with the present invention shown in an open position.

The housing 16 further includes a longitudinally extending and semicylindrical-shaped body portion 40. Horizontal sidewalls 42 extend from the body portion 40 and include depending flanges 44. The sidewalls 42 define a plurality of longitudinally spaced openings 46 positioned to cooperate with the front and rear rivet members 30,32 upstanding from the saddle 14, respectively. In addition, the housing 16 is attached to the saddle 14 such that the housing 16 pivots upward relative to the saddle 14. In particular, the housing 16 is connected to the saddle 14 so that the housing 16 may pivot about an axis passing through the second recesses 36 defined by the front rivet members 30. The front rivet members 30 preferably each further include a connecting tab 48 formed at a tip 49 of each of the front rivet members 30. The connecting tabs 48 are adapted to engage the sidewalls 42, as shown in FIGS. 8 and 9, to securely connect the saddle 14 to the housing 16. The connecting tabs 48 permit the pivotal movement of the housing 16 relative to the saddle 14 while securely connecting the housing 16 to the saddle 14. The connecting tabs 48 are preferably curled or bent over the sidewalls 42 of the housing 16 making the tightening mechanism 10 relatively easy and inexpensive to assemble. The housing 16 pivots about the front rivet members 30 to form an angle with the saddle 14 in the open position of the tightening mechanism 10, as shown in FIG. 1. The housing 16 pivots relative to the saddle 14 to a maximum angle of about 30°. The housing 16 pivots sufficiently upward relative to the saddle 14 whereby the free end 13 of the band 12 may pass through the spacing between the base portion 28 of the saddle 14 and the locking worm 18 positioned in the housing 16. An exemplary material for the housing 16 is 300 series stainless steel.

Referring to FIG. 9, the locking worm 18 includes grooves 50 adjacent the head portion 22 and the terminal end 25. The locking worm 18 "snap fits" into engagement with grooves 50 to rotatably secure the locking worm 18 to the housing 16 and, in particular, into engagement with the body portion 40 of the housing 16. The locking worm 18 is thereby secured in the recess 17 (shown in FIG. 4) defined by the housing 16 and the body portion 40, in particular, but is free to rotate in the body portion 40. It will be apparent that the locking worm 18 may be attached to the housing 16 in any manner that permits the locking worm 18 to rotate in the housing 16. An exemplary material for the locking worm 18 is series 410 stainless steel.

Figure 11:
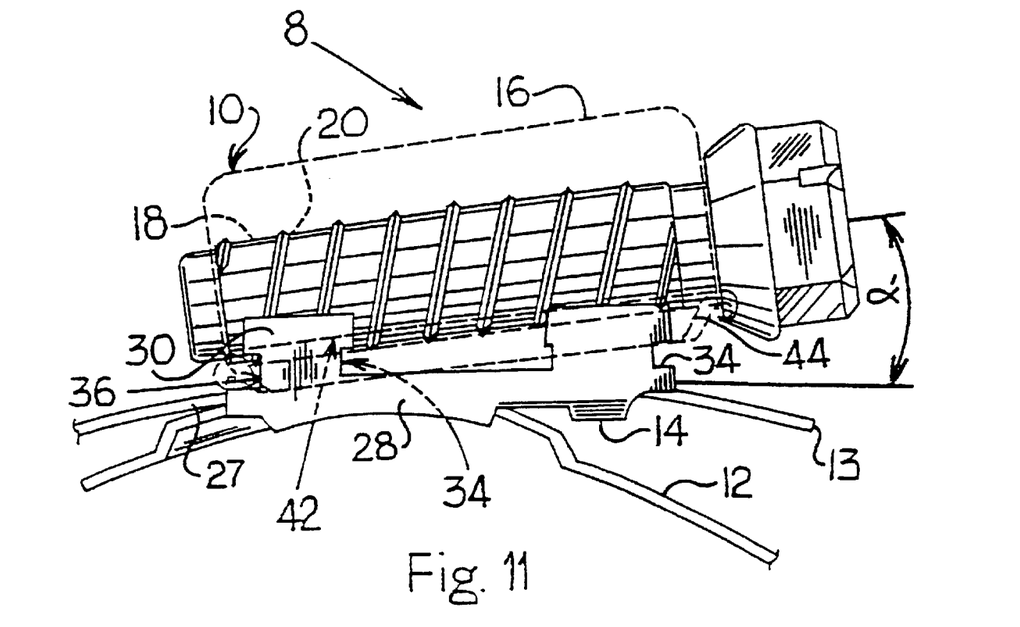
FIG. 11 is a partially broken elevational side view of the clamp assembly of FIG. 10 shown in a first intermediate position.

Referring to FIGS. 10–15, operation of the clamp assembly 8 will now be discussed in further detail. In the open position of the tightening mechanism 10 the housing 16 forms a maximum angle of about 30° with the saddle 14. The sidewalls 42 of the housing 16 are preferably seated in the second recesses 36 defined by the front rivet members 30 so that the openings 46 defined by the sidewalls 42 are axially offset relative to the rear rivet members 32. As a result of this offset, the rear rivet members 32 abut against the interior face of the housing 16. The housing 16 is thus prevented from pivoting into engagement with the saddle 14. The contact of the rear rivet members 32 with the interior face of the housing 16 acts as a stopping mechanism preventing the housing 16 from prematurely pivoting into engagement with the saddle 14, which makes initial insertion of the band 12 into the tightening mechanism 10 easier. The free end 13 of the band 12 may now be fed through the tightening mechanism 10 in the horizontal spacing between the two front and two rear rivet members 30,32 of the saddle 14 and the vertical spacing between the saddle 14 and the locking worm 18 until a desired diameter of the band 12 is reached. When the band 12 is released natural tension in the band 12 forces the band 12 radially outward so that the spiral threads 20 of the locking worm 18 engage the apertures 26 in the band 12. The engagement of the spiral threads 20 with the apertures 26 combined with the natural tension in the band 12 acting on the housing 16 through the locking worm 18 causes the housing 16 to move or "traverse" axially relative to the saddle 14 so that the rear rivet members 32 are now in a position to extend through the openings 46 in the housing 16. In addition, the engagement of the locking worm 18 with the band 12, combined with the natural tension in the band 12 acting on the housing 16, causes the housing 16 to pivot downward toward the saddle 14 to a first intermediate position as shown in FIG. 11. In FIG. 11, the housing 16 is positioned at an angle relative to the saddle 14, which is preferably between about 5°–20°.

Figure 12:
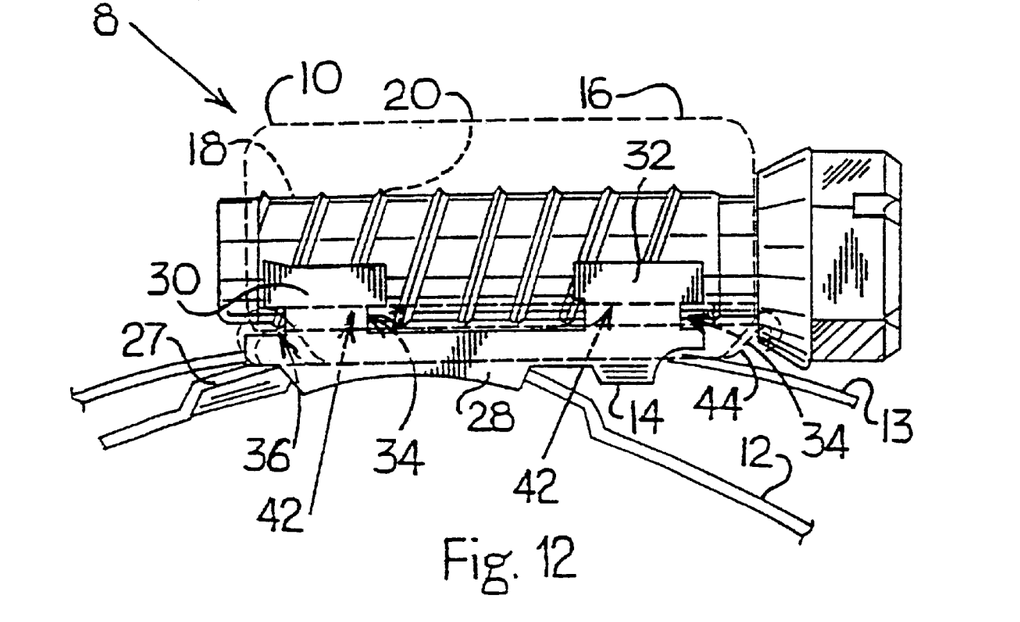
FIG. 12 is a partially broken elevational side view of the clamp assembly of FIG. 10 shown in a second intermediate position.
Figure 13:
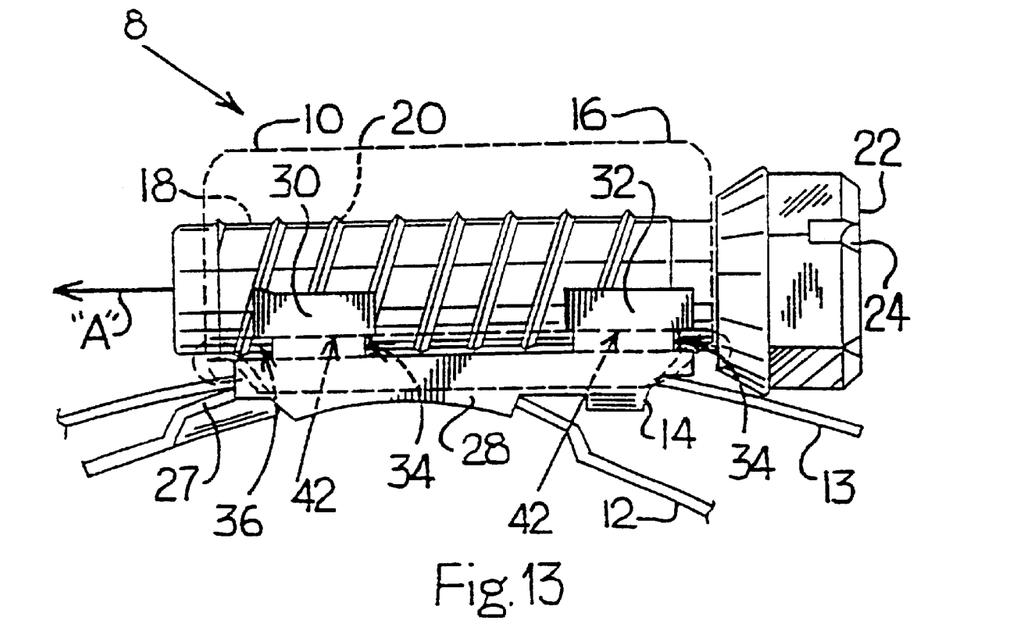
FIG. 13 is a partially broken elevational side view of the clamp assembly of FIG. 10 shown in a closed and locked position.
Figure 14:
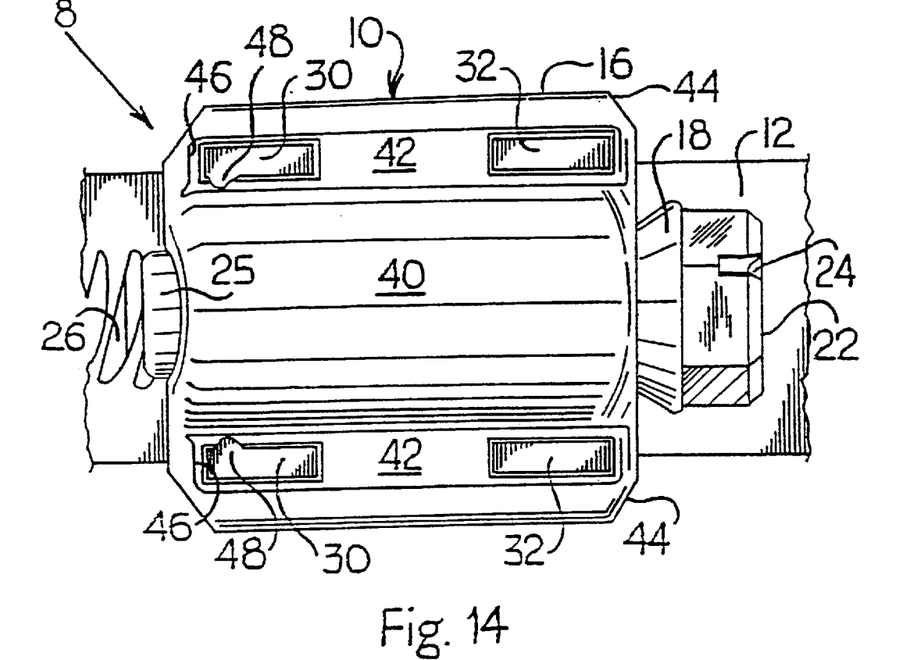
FIG. 14 is a top plan view of the clamp assembly of FIG. 12.
Figure 15:
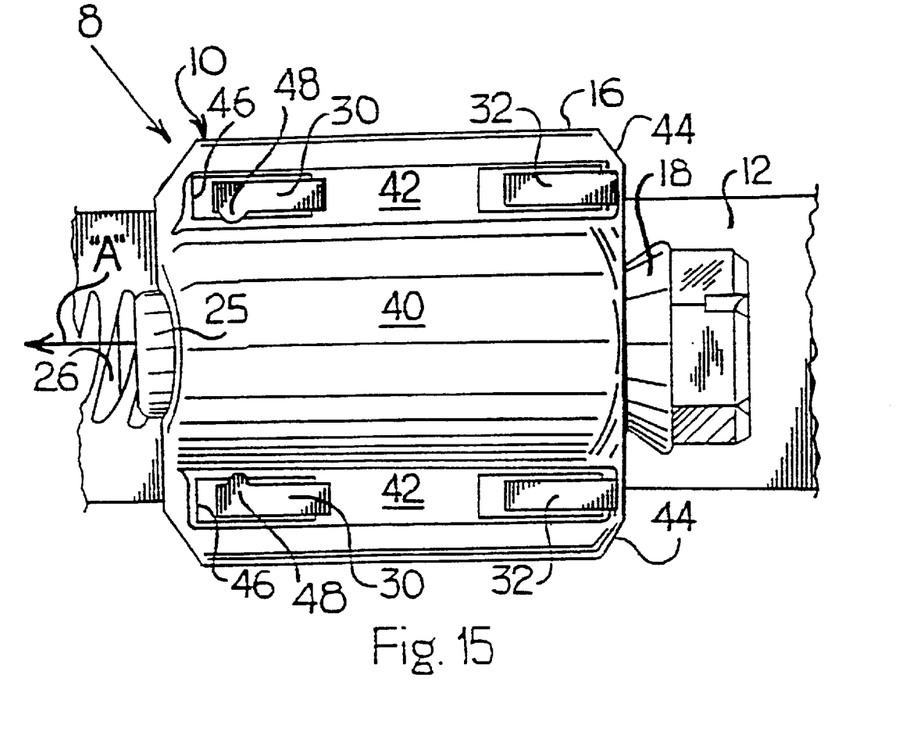
FIG. 15 is a top plan view of the clamp assembly of FIG. 13.

Referring to FIG. 12, the tightening mechanism 10 may now be placed in a second intermediate position, or closed position. The housing 16 is placed in the second intermediate position shown by applying downward pressure on the housing 16. In the second intermediate position, the sidewalls 42 of the housing 16 are substantially aligned with the first recesses 34 defined by the front and rear rivet members 30,32, but do not engage, or seat, in the first recesses 34. The sidewalls 42 of the housing 16 are no longer fully seated in the second recesses 36 defined by the front rivet members 30.

Referring now to FIGS. 12–15, the tightening mechanism 10 is placed in a closed and locked position by positioning a screwdriver in slot 24 in the head portion 22 of the locking worm 18 and rotating the locking worm 18 with the screwdriver. The rotational engagement of the spiral threads 20 in apertures 26 in the band 12 combined with the natural tension in the band 12 acting on the housing 16 causes the housing 16 and, in particular, the sidewalls 42 to "snap" fully into engagement with the first recesses 34 defined by the front and rear rivet members 30,32. The tightening mechanism 10 is now closed and locked and the clamp assembly 8 is ready for further tightening around the conduit (not shown). The rotational engagement of the spiral threads 20 in apertures 26 in the band 12 causes the band 12 to shorten in length and tighten around the conduit. The clamp assembly 8 may be placed in the open position by reversing the steps of the operation described hereinabove.

In summary, the housing co-acts with the first recesses 34 defined by the front and rear rivet members 30,32 and the second recesses 36 defined by the front rivet members 30 to permit the housing 16 to "traverse" or move in an axial direction relative to the saddle 14. The traverse or axial movement of the housing 16 relative to the saddle 14 is identified by arrow "A" in FIGS. 13 and 15, which shows the direction of movement of the housing 16 to fully seat in the first recesses 34. Additionally, the second recesses 36 defined by the front rivet members 30 and the connecting tabs 48 enable the housing 16 to pivot relative to the saddle 14.

Ideally, the first recesses 34 are defined such that as the tightening mechanism 10 is tightened with a screwdriver, the housing 16 continues to move downward into engagement with and compress against the saddle 14 and the band 12 positioned therein. This "wedge" action of the housing 16 into the saddle 14 locks the housing 16 in place ensuring high torque transmission to the band 12. The locking worm 18 is also locked in place in the housing 16 allowing the housing/screw combination to remain intact and yet pivot in concert so that the band 12 may move freely through the tightening mechanism 10.

Figure 16:
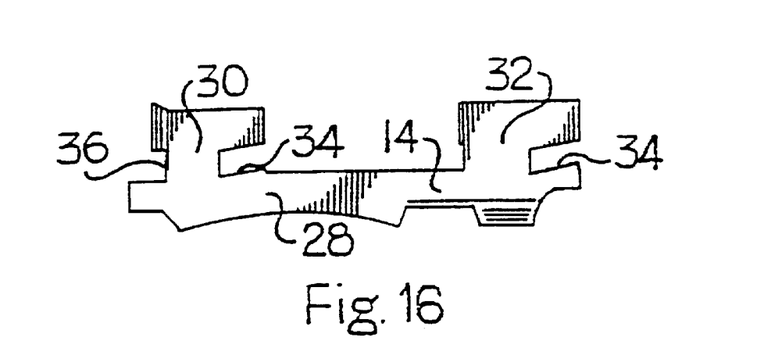
FIG. 16 is an elevational side view of a saddle of the clamp assembly defining slanted recesses.
Figure 17:
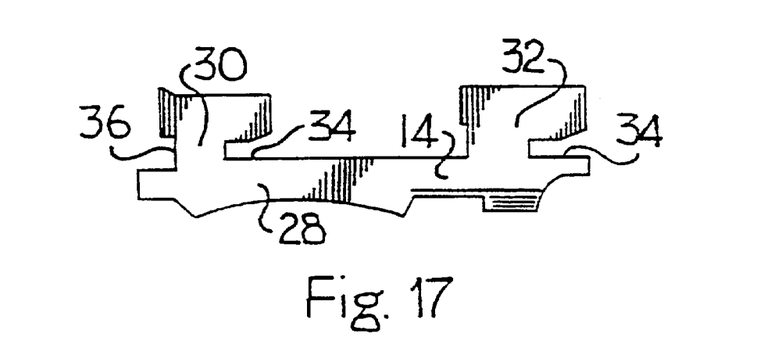
FIG. 17 is an elevational side view of a second embodiment of the saddle shown in FIG. 14.

The front recesses 34 may have an arcuate shape, or a slanted shape as shown in FIG. 16. Referring to FIG. 16, it will be apparent that as tightening mechanism 10 is further tightened, the sidewalls 42 seated in the first recesses 34 defined by the front and rear rivet members 30,32 will follow the shape of the first recesses 34 and compress further against the saddle 14 and the band 12 positioned therein. The arcuate or slanted orientation of the first recesses 34 in the front and rear rivet members 30,32 provides the "wedge" or camming action due to the downward taper of the first recesses 34, thus providing a clamp assembly 8 of greater strength and having a greater "wedge" action than those currently known in the art. FIG. 17 shows a second embodiment of the saddle 14 shown in FIG. 16 which provides a similar camming or wedge action.

Based on the foregoing, the present invention provides a clamp assembly having quick connect and disconnect features. Additionally, the clamp assembly according to the present invention provides a high-strength worm-driven clamp assembly that overcomes the disadvantages known in the prior art. Furthermore, the clamp assembly according to the present invention is relatively simple to assemble and, therefore, inexpensive to produce. The clamp assembly specifically provides a tightening mechanism having a pivotable housing and a housing capable of axial or traverse movement relative to the saddle of the tightening mechanism.

The present invention has been described with reference to the preferred embodiments which are merely illustrative of the present invention and not restrictive thereof. Obvious modifications and alterations of the invention may be made without departing from the spirit and scope of the invention. The scope of the invention is defined in the appended claims and equivalents thereto.

We claim:
1. A clamp assembly, comprising:
a band having a free end defining a plurality of slots;
a saddle secured to the band and including at least one first rivet member and at least one second rivet member located at opposite ends of the saddle, with the first and second rivet members each defining a recess;
a housing pivotally connected to the saddle by the first rivet member, with the housing having a sidewall defining openings configured to cooperate with the first and second rivet members; and
a worm screw positioned in the housing and rotatably connected to the housing, with the housing and worm screw pivotable about the first rivet member between an open position in which the housing and worm screw form an angle with the saddle and in which the worm screw defines a space with the saddle for receiving the free end of the band, and a closed position in which the first and second rivet members substantially extend through the openings in the sidewall of the housing, wherein with the free end of the band positioned between the worm screw and the saddle and with the housing and worm screw in the closed position, the worm screw engages the slots defined in the free end of the band for tightening the clamp assembly, and wherein in the closed position of the housing and worm screw, the housing is movable in an axial direction relative to the saddle such that the sidewall of the housing seats in the recesses defined by the first and second rivet members.

2. The clamp assembly of claim 1, wherein the saddle is secured to the band by one of welding, crimping and fasteners.

3. The clamp assembly of claim 1, wherein the recesses are slanted in a direction toward a base portion of the saddle.

4. The clamp assembly of claim 1, wherein the first rivet member includes a connecting tab, and wherein the housing is connected to the saddle by the connecting tab.

5. The clamp assembly of claim 4, wherein the connecting tab is curled over the sidewall of the housing.

6. The clamp assembly of claim 1, wherein the worm screw includes a head portion defining a slot configured to accept a screwdriver for tightening the clamp assembly.

7. The clamp assembly of claim 5, wherein the worm screw further includes a terminal portion and defines grooves adjacent the head portion and the terminal portion, wherein the housing includes a substantially semicircular-shaped body portion for housing the worm screw, and wherein the body portion is received in the grooves to rotatably connect the worm screw to the housing.

8. The clamp assembly of claim 1, wherein the band, the saddle, the housing and the worm screw are made of stainless steel.

9. A clamp assembly for use with a conduit, comprising:

a flexible band adapted to encircle the conduit and having a free end defining a plurality of slots;

a saddle secured to the band and including at least one first rivet member and at least one second rivet member located at opposite ends of the saddle, with the first and second rivet members each defining a first recess, and with the first rivet member defining a second recess opening in an opposite direction from the first recess;

a housing pivotally connected to the saddle by the first rivet member, with the housing having a sidewall defining openings configured to cooperate with the first and second rivet members; and a worm screw positioned in the housing and rotatably connected to the housing, with the housing and worm screw pivotable about the first rivet member between an open position in which the housing and worm screw form an angle with the saddle and in which the worm screw defines a space with the saddle for receiving the free end of the band, and a closed position in which the first and second rivet members substantially extend through the openings in the sidewall of the housing, wherein with the free end of the band positioned between the worm screw and the saddle and with the housing and worm screw in the closed position, the worm screw engages the slots defined in the free end of the band for tightening the clamp assembly, and wherein in the closed position of the housing and worm screw, the housing is movable in an axial direction relative to the saddle such that the sidewall of the housing seats in the first recesses defined by the first and second rivet members.

10. The clamp assembly of claim 9, wherein the saddle is secured to the band by one of welding, crimping and fasteners.

11. The clamp assembly of claim 9, wherein the first recesses is slanted in a direction toward a base portion of the saddle.

12. The clamp assembly of claim 9, wherein the first rivet member includes a connecting tab, and wherein the housing is connected to the saddle by the connecting tab.

13. The clamp assembly of claim 12, wherein the connecting tab is curled over the sidewall of the housing.

14. The clamp assembly of claim 9, wherein the worm screw includes a head portion defining a slot configured to accept a screwdriver for tightening the clamp assembly.

15. The clamp assembly of claim 14, wherein the worm screw includes a terminal portion and defines grooves adjacent the head portion and the terminal portion, wherein the housing includes a substantially semicircular-shaped body portion for housing the worm screw, and wherein the body portion is received in the grooves to rotatably connect the worm screw to the housing.

16. The clamp assembly of claim 9, wherein the band, the saddle, the housing and the worm screw are made of stainless steel.

17. A clamp assembly for use with a conduit, comprising:

a flexible band adapted to encircle the conduit and having a free end defining a plurality of slots;

a saddle secured to the band and including a pair of equally spaced first rivet members and a pair of equally spaced second rivet members located at opposite ends of the saddle, with the first and second rivet members each defining a first recess, and with the first rivet members each further including a connecting tab and defining a second recess opening in an opposite direction from the first recess;

a housing pivotally connected to the saddle by the connecting tabs, with the housing having sidewalls defining openings configured to cooperate with the first and second rivet members, wherein the connecting tabs are curled over the sidewalls of the housing; and a worm screw positioned in the housing and rotatably connected to the housing, with the housing and worm screw pivotable about the first rivet members between an open position in which the housing and worm screw form an angle with the saddle and in which the worm screw defines a space with the saddle for receiving the free end of the band, and a closed position in which the first and second rivet members substantially extend through the openings in the sidewalls of the housing, wherein with the free end of the band positioned between the worm screw and the saddle and with the housing and worm screw in the closed position, the worm screw engages the slots defined in the free end of the band for tightening the clamp assembly, and wherein in the closed position of the housing and worm screw, the housing is movable in an axial direction relative to the saddle such that the sidewalls of the housing seat in the first recesses defined by the first and second rivet members.

18. The clamp assembly of claim 17, wherein the worm screw includes a head portion defining a slot configured to accept a screwdriver for tightening the clamp assembly.

19. The clamp assembly of claim 18, wherein the worm screw includes a terminal portion and defines grooves adjacent the head portion and the terminal portion, wherein the housing includes a substantially semicircular-shaped body portion for housing the worm screw, and wherein the body portion is received in the grooves to rotatably connect the worm screw to the housing.

20. The clamp assembly of claim 19, wherein the band, the saddle, the housing, and the worm screw are made of stainless steel.

* * * * *